United States Patent [19]

Mullen

[11] Patent Number: 5,380,986
[45] Date of Patent: Jan. 10, 1995

[54] MULTI-PURPOSE ELECTRIC FAST COOKING APPARATUS

[76] Inventor: Charles F. Mullen, 204 Yacht Club La., Seabrook, Tex. 77586

[21] Appl. No.: 181,296

[22] Filed: Jan. 13, 1994

[51] Int. Cl.$^6$ .......................... A47J 37/00; H05B 3/68
[52] U.S. Cl. .................................. 219/472; 219/521; 219/474; 219/525; 219/438; 99/376
[58] Field of Search ............ 219/472, 474, 524, 525, 219/521, 432, 433, 436, 438; 99/372, 376

[56] References Cited

U.S. PATENT DOCUMENTS

| | | | |
|---|---|---|---|
| 1,077,866 | 11/1913 | Ball | 219/521 |
| 1,992,843 | 2/1935 | Serenberg | 219/472 |
| 2,478,529 | 8/1949 | Farr | 219/524 |
| 3,172,999 | 3/1965 | Sutton | 219/524 |
| 3,348,470 | 10/1967 | Swanson | 219/524 |
| 3,947,657 | 3/1976 | Ershler | 219/521 |
| 4,889,972 | 12/1989 | Chang | 219/472 |

*Primary Examiner*—Teresa J. Walberg
*Attorney, Agent, or Firm*—Kenneth A. Roddy

[57] ABSTRACT

A portable multi-purpose electric fast cooking apparatus for use in cooking a variety of foods by various methods. The apparatus includes a pair of hinged pan-shaped housing members having a bottom wall and a side wall which can be pivoted between a closed position superposed one above the other in opposed facing relation and an open position laterally adjacent one another, and each housing has a laterally extending handle to serve as a carrying handle when the housing members are in the closed position. A heating plate is carried by each housing member and each plate has a heating element secured to its underside and an outward facing side with a central depressed flat surface surrounded by a raised side wall and shoulder at the top thereof. Each heating element is individually controlled by a separate thermostat. In the closed position, the depressed flat surfaces, surrounding raised side walls and shoulders define a central cavity. In the open position, the depressed flat surface, raised side wall, and shoulder of each plate serve as a mounting surface to receive cooking vessels having mating bottom. The preferred apparatus includes a pot member, a pan member having an open top end configured to be received on the pot member in inverted relation to serve as a cover therefor, and a wire grill capable of being supported either on the heating plate or inside the pot.

9 Claims, 6 Drawing Sheets

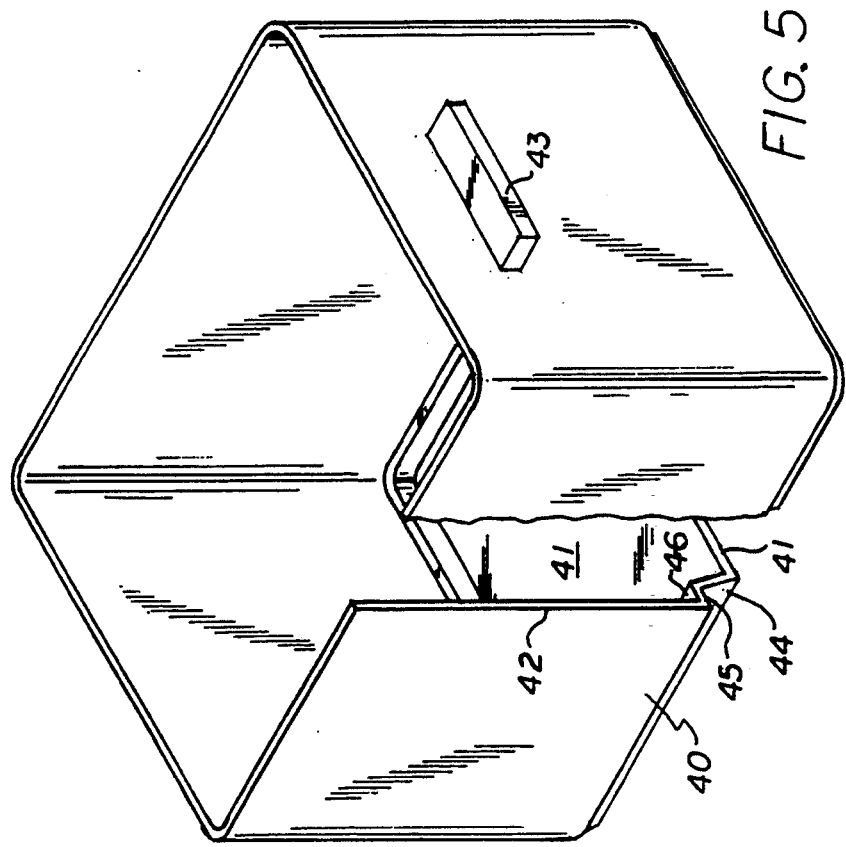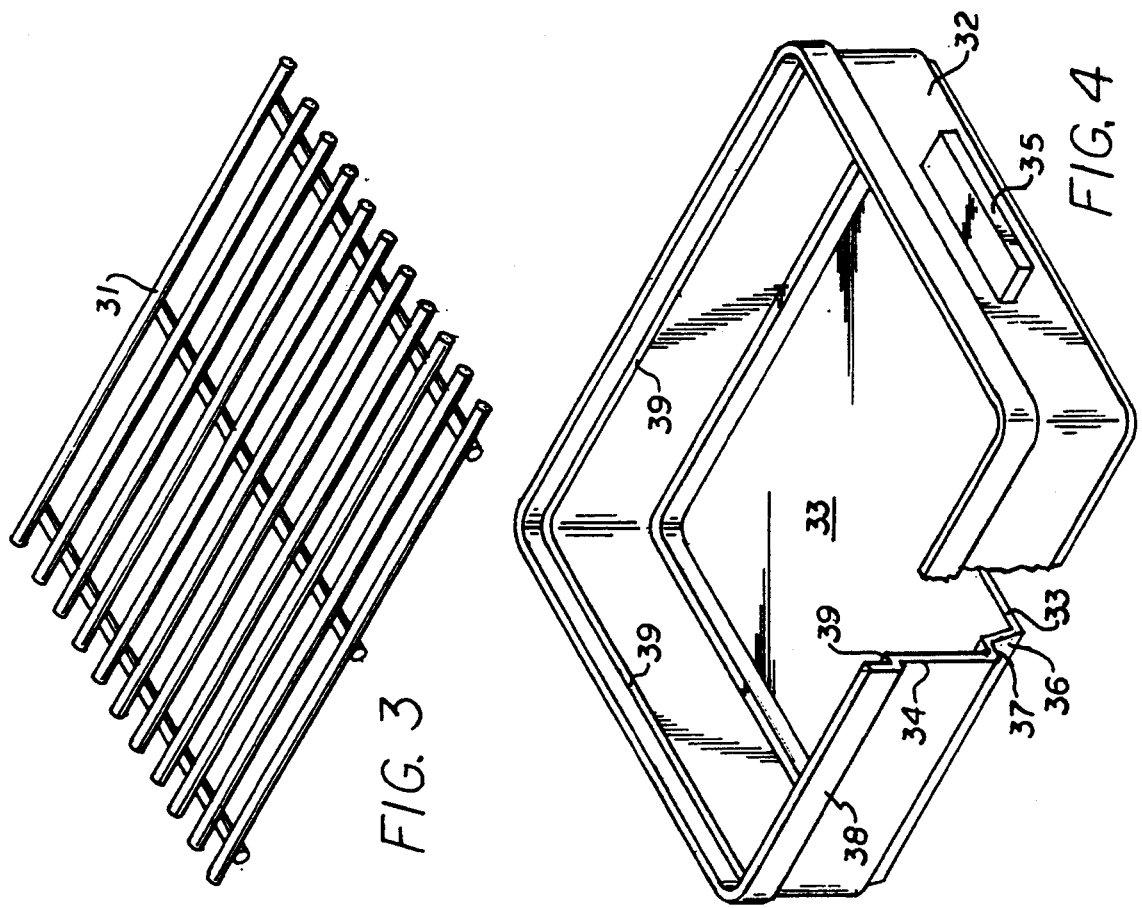

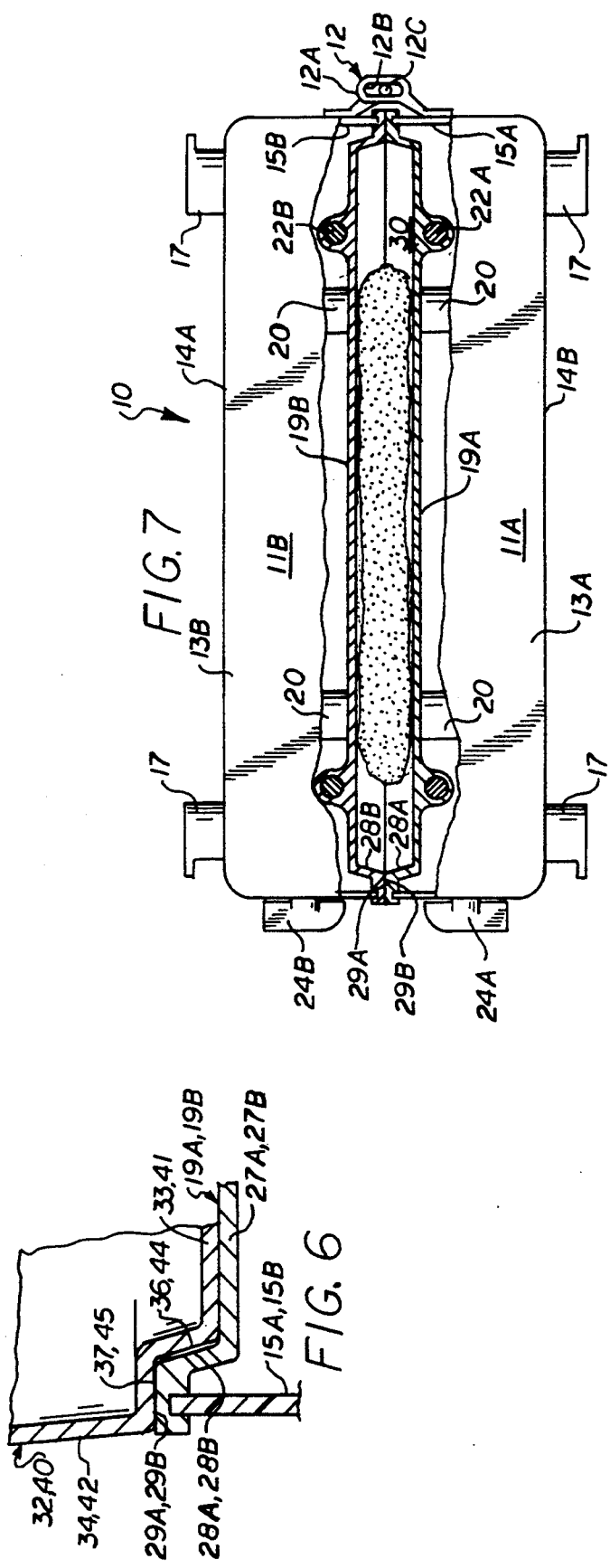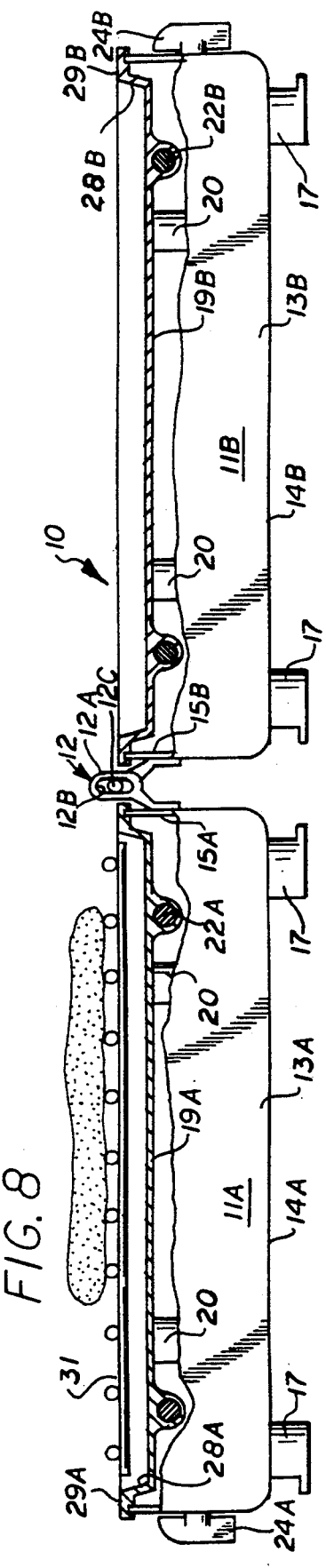

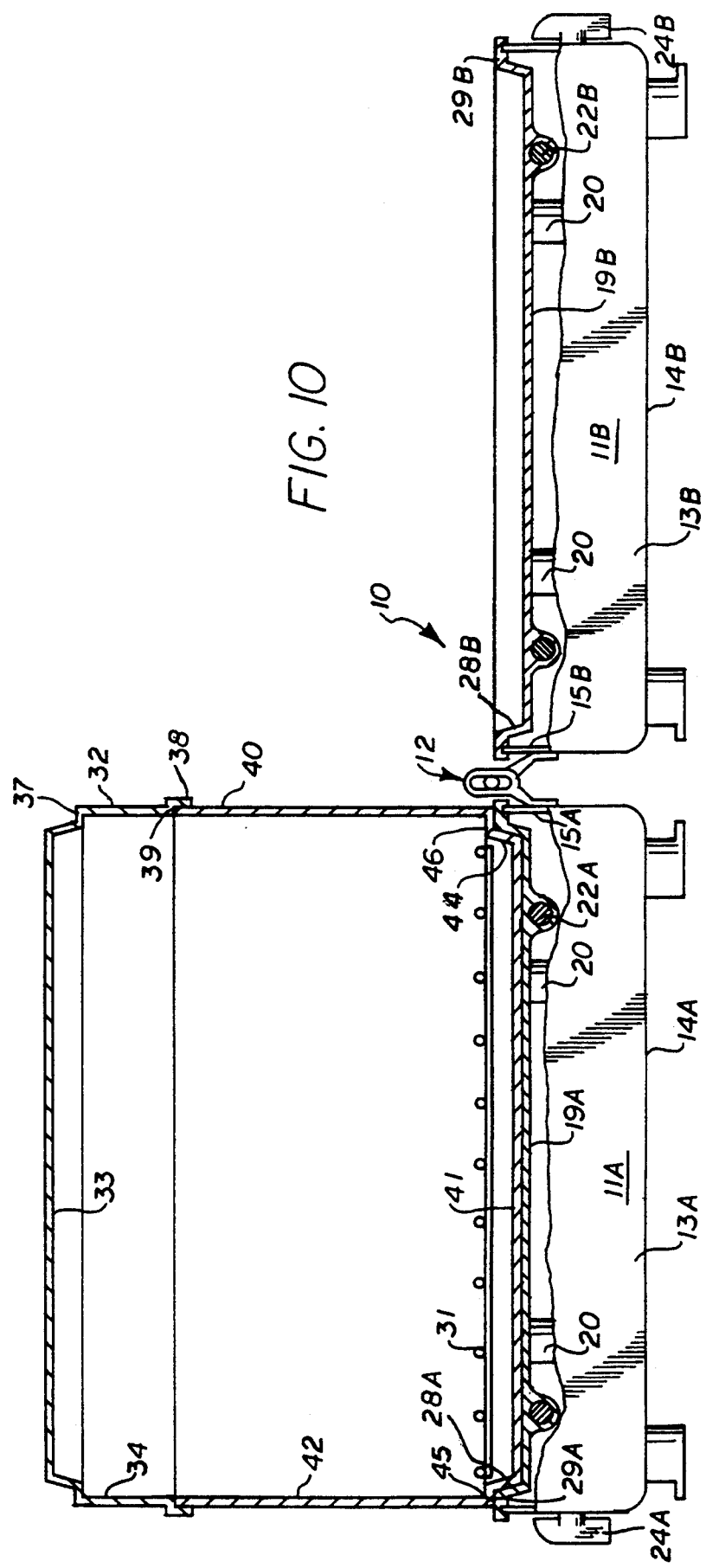

MULTI-PURPOSE ELECTRIC FAST COOKING APPARATUS

BACKGROUND OF THE INVENTION

1. Field of the Invention

This invention relates generally to electrical fast cookers, and more particularly to a portable multi-purpose electric fast cooking apparatus including a hinged heating appliance and several interchangeable cooking vessels which can be employed in various combinations for cooking a wide variety of foods.

1. Brief Description of the Prior Art

Electrical fast cookers of the type used for quickly cooking hamburgers, sandwiches, waffles, pancakes, and the like, are known in the art. These types of cookers usually have a pair of hinged plates which are superposed to contact the top and bottom surface of the food being cooked, and are not suitable for use in cooking other foods.

Levin, U.S. Pat. No. 4,011,431 discloses an electric fast cooking appliance for cooking hamburgers and sandwiches which has a single heating element and a reversible grill having cooking surfaces of various configurations on opposite sides. Both sides of the reversible grill have grooves adapted to receive, in heat exchange relation, a heated rib depending from the downwardly directed cooking surface of the unit cover.

Thelander, U.S. Pat. No. 4,163,418 discloses an electric cooking appliance adapted for cooking a particular food product called a "jaffle" (two slices of bread with filling between, the bread slices being compressed and sealed around the edges and then toasted). The appliance has a hinged upper and lower cooking plate each with a series of concavities surrounded by a circular rim and a cutting bead which cooperate when the plates are closed to compress the bread and filling, cut away the excess bread, and seal the bread slices together.

Coppier, U.S. Pat. No. 5,129,313 discloses an electric cooking appliance for toasting food which has two cooking plates hinged together. Each cooking plate is constructed of diestamped sheet metal and is attached to a sheet metal support plate that forms a heat reflector.

Crockpots are known in the art which have a heating element in contact with a crockery vessel and are capable of cooking casseroles and varied shaped objects at a relative low temperature for a substantial period of time.

Du Bois et al, U.S. Pat. No. 3,908,111 discloses a crockpot comprising a single primary deep well cooking vessel having a shoulder at the mouth thereof which removably receives and supports a secondary crockery vessel wherein the side walls and bottom walls of the two vessels are spaced apart to provide an air space therebetween to produce a thermal lag between the heating element and the crockery vessel for slow cooking.

One of the drawbacks of earlier structures is that they are limited, when operated in their normal fashion, to cooking very slowly or to only cooking food articles having a single configuration, for instance, the flat shape of a hamburger or sandwich. The are also limited in that the temperature of the cooking surfaces are not individually controlled and only one type of food can be cooked at a time.

Microwave cooking is widely popular because a variety of healthful foods can be cooked very fast. However, the microwave oven is relatively expensive, occupies a large amount of space, and is not easily portable.

There has been a need for a fast cooker which is easily portable and wideranging in its usefulness in cooking a variety of foods including sandwiches, meat, poultry, irregular shaped foods, and frozen TV dinners and for carrying out nearly all cooking requirements such as grilling, broiling, frying, baking, toasting, boiling, steaming, and pressure cooking, etc. There has also been a need for a fast cooker which will cook various different types of foods at the same time.

The present invention is distinguished over the prior art in general, and these patents in particular by a portable multi-purpose electric fast cooking apparatus for use in cooking a variety of foods by various methods. The apparatus includes a pair of hinged pan-shaped housing members having a bottom wall and a side wall which can be pivoted between a closed position superposed one above the other in opposed facing relation and an open position laterally adjacent one another, and each housing has a laterally extending handle to serve as a carrying handle when the housing members are in the closed position. A heating plate is carried by each housing member and each plate has a heating element secured to its underside and an outward facing side with a central depressed flat surface surrounded by a raised side wall and shoulder at the top thereof. Each heating element is individually controlled by a separate thermostat. In the closed position, the depressed flat surfaces, surrounding raised side walls and shoulders define a central cavity. In the open position, the depressed flat surface, raised side wall, and shoulder of each plate serve as a mounting surface to receive cooking vessels having mating bottom. The preferred apparatus includes a pot member, a pan member having an open top end configured to be received on the pot member in inverted relation to serve as a cover therefor, and a wire grill capable of being supported either on the heating plate or inside the pot.

SUMMARY OF THE INVENTION

It is therefore an object of the present invention to provide a portable multi-purpose electric fast cooking apparatus having several interchangeable cooking vessels which can be employed in various combinations for cooking a wide variety of foods.

It is another object of this invention to provide a portable multi-purpose electric fast cooking apparatus having a pair of individually controlled hinged heating plates adapted to receive interchangeable cooking vessels which can be employed in various combinations for cooking a wide variety of foods at the same time.

Another object of this invention is to provide a portable multi-purpose electric fast cooking apparatus which will allow fast cooking of foods of various shapes and thicknesses.

Another object of this invention is to provide a portable multi-purpose electric fast cooking apparatus having a specially configured heating plate and a set of interchangeable cooking vessels which are designed to be mounted on the heating plate in a highly efficient heat transfer relation.

Another object of this invention is to provide a portable multi-purpose electric fast cooking apparatus having a specially configured heating plate and a set of interchangeable cooking vessels which allow mesquite, hickory, and other shavings, or various liquids to be used during cooking to impart various flavors to the food.

A further object of this invention is to provide a portable multi-purpose electric fast cooking apparatus which is small and easily portable, and occupies a small amount of space.

A still further object of this invention is to provide a portable multi-purpose electric fast cooking apparatus which is simple in construction, economical to manufacture, and attractive in appearance.

Other objects of the invention will become apparent from time to time throughout the specification and claims as hereinafter related.

The above noted objects and other objects of the invention are accomplished by a portable multi-purpose electric fast cooking apparatus for use in cooking a variety of foods by various methods. The apparatus includes a pair of hinged panshaped housing members having a bottom wall and a side wall which can be pivoted between a closed position superposed one above the other in opposed facing relation and an open position laterally adjacent one another, and each housing has a laterally extending handle to serve as a carrying handle when the housing members are in the closed position. A heating plate is carried by each housing member and each plate has a heating element secured to its underside and an outward facing side with a central depressed flat surface surrounded by a raised side wall and shoulder at the top thereof. Each heating element is individually controlled by a separate thermostat. In the closed position, the depressed flat surfaces, surrounding raised side walls and shoulders define a central cavity. In the open position, the depressed flat surface, raised side wall, and shoulder of each plate serve as a mounting surface to receive cooking vessels having mating bottom. The preferred apparatus includes a pot member, a pan member having an open top end configured to be received on the pot member in inverted relation to serve as a cover therefor, and a wire grill capable of being supported either on the heating plate or inside the pot.

BRIEF DESCRIPTION OF THE DRAWINGS

FIG. 3 is an isometric view of a grill component of the portable multi-purpose electric fast cooking apparatus.

FIG. 4 is an isometric view of a fry pan component of the portable multi-purpose electric fast cooking apparatus.

FIG. 5 is an isometric view of a pot component of the portable multi-purpose electric fast cooking apparatus.

FIG. 6 is a cross section of a portion of a heating plate and cooking vessel mounted thereon showing the mounting arrangement.

FIG. 7 is a side view in partial cross section of the portable multi-purpose electric fast cooking apparatus in the closed position as it would be used as a mini-oven in cooking TV dinners, sandwiches and other flat foods.

FIG. 8 is a side view in partial cross section of the portable multi-purpose electric fast cooking apparatus in the open position with a grill mounted thereon as it would be used in grilling various foods.

FIG. 10 is a side view of the portable multi-purpose electric fast cooking apparatus in the open position showing the pot component on one heating plate and using the fry pan component as a lid and showing a grill component at the bottom of the pot.

DESCRIPTION OF THE PREFERRED EMBODIMENT

Figure 1:
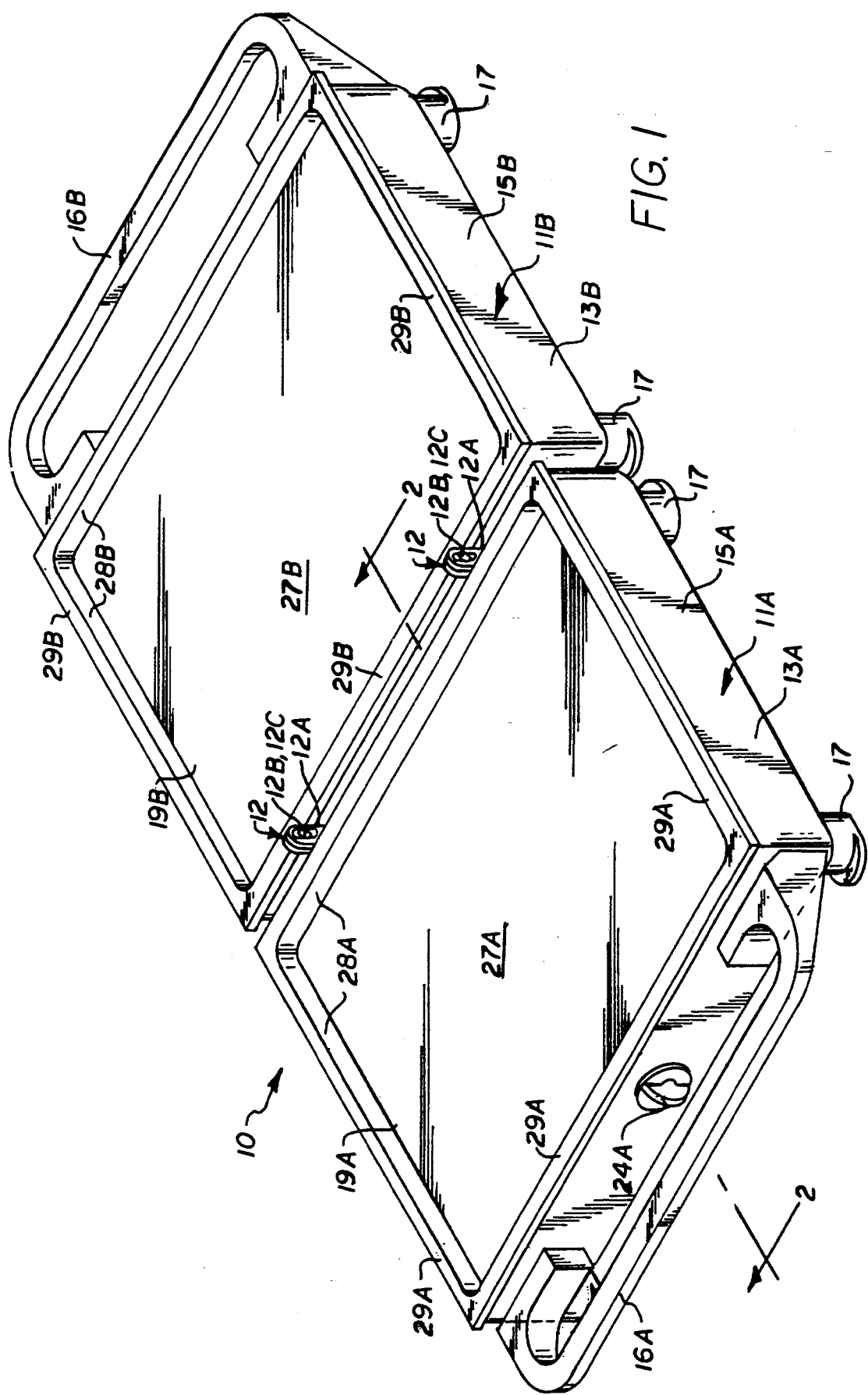
FIG. 1 is an isometric view of the hinged heating base of the portable multi-purpose electric fast cooking apparatus in accordance with the present invention, shown in an open position.
Figure 2:
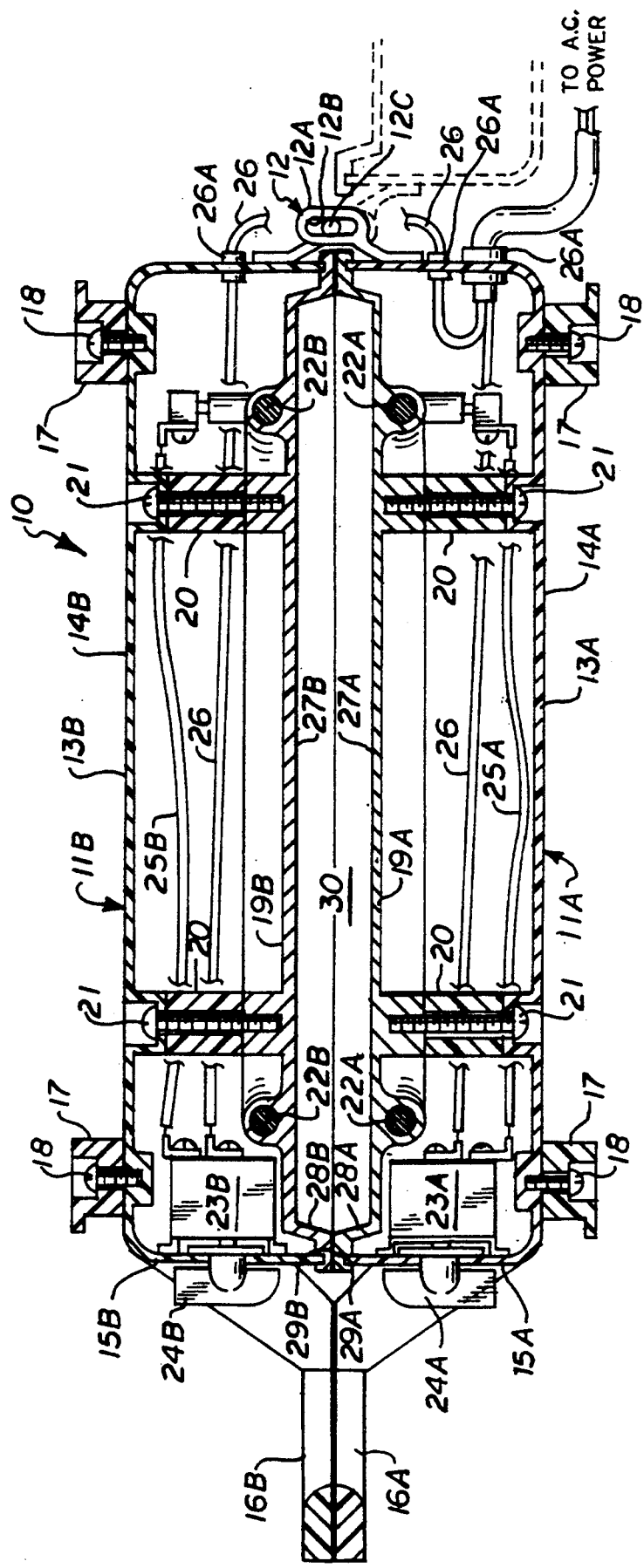
FIG. 2 is a side view in cross section of the hinged heating base of the portable multi-purpose electric fast cooking apparatus taken along line 2—2 of FIG. 1, shown in the closed position.

Referring now to the drawings by numerals of reference, there is shown in FIG. 1, a preferred portable multi-purpose electric fast cooking apparatus 10 in the open position. FIG. 2 shows a cross section of the portable multi-purpose electric fast cooking apparatus 10 in a closed position.

The portable multi-purpose electric fast cooking apparatus 10 has a pair of generally rectangular heating bases 11A and 11B which are hingedly connected together by a floating hinge 12. One hinge element of the floating hinge 12 has an ear 12A provided with a slot 12B through which the mating hinge element ear is pivotally connected by a pivot pin 12C. In this manner, the heating bases 11A and 11B can be pivoted between the open position (FIG. 1) and a superposed closed position (FIG. 2) and the slot allows the vertical distance between the two superposed bases to be adjusted as needed to accommodate flat foods of various thicknesses.

The heating bases 11A and 11B are substantially identical in construction. Each base 11A and 11B has a generally rectangular pan-shaped housing 13A and 13B, respectively, each having a bottom wall 14A and 14B, and a contiguous side wall 15A and 15B extending upwardly therefrom formed of suitable heat resistant plastic or metal material. A laterally extending handle 16A and 16B is secured to the side wall 15A and 15B of each housing 13A and 13B which serves as a carrying handle when the bases 11A and 11B are in the closed position. Leg members 17 are secured to the bottom wall 14A and 14B of each housing 13A and 13B by conventional means such as screws 18.

A metal heating plate 19A and 19B is secured to the open end of the side wall 15A and 15B of each housing 13A and 13B. Each heating plate overlaps the edge of the respective side wall and is supported on spacers 20 secured by screws 21 extending therethrough between the housing bottom walls 14A and 14B and the heating plates 19A and 19B. Rod-like heating elements 22A and 22B each formed in a generally rectangular or square configuration are secured to the underside of each heating plate 19A and 19B, respectively, by conventional means such as brazing or welding, or may be cast into each heating plate.

Thermostats 23A and 23B are secured to the side walls 15A and 15B, inside each housing 13A and 13B, respectively, and each has a control knob 24A and 24B on the exterior of the housing. Each thermostat 23A and 23B is connected to a respective heating element 22A and 22B by a shielded electrical lead 25A and 25B. The thermostats 23A and 23B are connected in parallel by a shielded electrical lead 26 which extends through strain reliefs 26A in the side walls 15A and 15B of the housings 13A and 13B. Thus, the temperature of each heating plate 19A and 19B can be independently controlled by its respective thermostat 23A and 23B. The metal heating plates 19A and 19B may be provided with a non-stick coating for easy cleaning.

Each heating plate 19A and 19B has a central depressed flat surface 27A and 27B surrounded by a raised side wall 28A and 28B and shoulder 29A and 29B, respectively. When the heating plates 19A and 19B are closed, the superposed depressed flat surfaces 27A and 27B define a central cavity 30 (FIG. 2) surrounded by the raised side walls 28A and 28B and shoulders 29A and 29B. As explained hereinafter, the depressed flat surfaces 27A and 27B, side walls 28A and 28B, and shoulders 29A and 29B also serve as a mounting surface for receiving and engaging the bottom of various cooking vessels in highly efficient heat transfer relation.

The portable multi-purpose electric fast cooking apparatus 10 is provided with at least one grill and several cooking vessels for cooking a variety of foods by various methods.

FIG. 3 shows a wire grill 31 formed of parallel rods or wires. The grill 31 is dimensioned such that it can be supported on the shoulder 29A or 29B of the heating plate 19A or 19B with the grill spaced a distance above the depressed flat surface 27A or 27B of the respective heating plate.

FIG. 4 shows a fry pan vessel 32 which has a flat bottom wall 33 and an upwardly extending side wall 34 forming a shallow-well configuration open at the top end. A handle 35 is secured to opposite sides of the side wall 34 and each extends laterally outward therefrom. The bottom portion of the fry pan side wall 34 has a reduced periphery 36 which extends upwardly a short distance from the bottom wall 33 and then outwardly to define a peripheral shoulder 37. The reduced periphery 36 and shoulder 37 are dimensioned to mate with the heating plate 19A or 19B such that the fry pan shoulder 37 will engage the shoulder 29A or 29B of the heating plate 19A or 19B and the bottom wall 33 of the fry pan 32 will engage the flat depressed surface 27A or 27B of the respective heating plate with very small clearance between the reduced periphery 36 of the bottom portion of the fry pan and the inner periphery of the raised side wall 28A or 28B of the heating plate on which it is placed. The upper portion of the fry pan side wall 34 has an enlarged periphery 38 which extends downwardly a short distance and then inwardly to define an interior shoulder 39 near the open top end. The enlarged periphery 38 and interior shoulder 39 are dimensioned to be received on the top edge of a pot vessel in inverted relation to serve as a lid or cover, as described below.

FIG. 5 shows a pot vessel 40 which has a flat bottom wall 41 and an upwardly extending side wall 42 forming a deepwell configuration open at the top end. A handle 43 is secured to opposite sides of the side wall 42 and each extends laterally outward therefrom. The bottom portion of the pot side wall 42 has a reduced periphery 44 which extends upwardly a short distance from the bottom wall 41 and then outwardly to define an outer peripheral shoulder 45 and an inner shoulder 46. The reduced periphery 44 and outer shoulder 45 are dimensioned to mate with the heating plate 19A or 19B such that the pot shoulder 45 will engage the shoulder 29A or 29B of the heating plate 19A or 19B and the bottom wall 41 of the pot 4C will engage the flat depressed surface 27A or 27B of the respective heating plate with very small clearance between the reduced periphery 44 of the bottom portion of the pot and the inner periphery of the raised side wall 28A or 28B of the heating plate on which it is placed. The inner shoulder 46 is dimensioned to support the wire grill 31.

FIG. 6 shows a portion of a heating plate and cooking vessel mounted thereon illustrating the mounting detail. The depressed flat surface 27A and 27B, side wall 28A and 28B, and shoulder 29A and 29B of the heating plates 19A and 19B, respectively, serve as a mounting surface for receiving and engaging the various cooking vessels. The reduced periphery 36 and 44 and shoulder 37 and 45 of the fry pan 32 and pot 40, respectively, mate with the heating plate 19A or 19B such that the fry pan shoulder 37 and pot shoulder 45 will engage the shoulder 29A or 29B of the heating plate 19A or 19B and the fry pan bottom wall 33 and pot bottom wall 41 will engage the flat surface 27A or 27B of the heating plate on which it is placed, with very small clearance between the outer periphery 36 or 34 of the bottom portion of the fry pan or pot and the inner periphery of the raised wall 28A or 28B of the respective heating plate. The particular mating arrangement of the bottom of the fry pan and pot gives them stability on the heating plate and the mating shoulders and small clearance restricts heat loss, provides highly efficient heat transfer, and conserves energy.

Although the portable multi-purpose electric fast cooking apparatus 10 and associated cooking vessels have been described and shown as being generally rectangular configurations, it should be understood that they may also be generally square or circular configurations. It should also be understood that conventional pots and pans may be used with the apparatus.

In the following discussion the drawing figures show the heating plates and cooking vessels in cross section but the components on the interior of the bases 11A and 11B which have been previously shown and described with reference to FIGS. 1 and 2 are not shown in detail to avoid confusion.

Referring now to FIG. 7, the portable multi-purpose electric fast cooking apparatus 10 is shown with the hinged heating bases 11A and 11B in the closed position as it would be used as a mini-oven or toaster. The food to be cooked is placed on the depressed flat surface 27A of one heating plate 19A of one base 11A and the other heating base 11B is pivoted to the superposed closed position. In this arrangement, one thermostat 23A or 23B may be set to heat only one heating plate for cooking or heating one side of the food, or both thermostats may be used to cook or heat both surfaces of the food simultaneously.

If the food is frozen, both thermostats 23A and 23B may be set on a high temperature to quickly defrost the food, and then after defrosting, one or both thermostats can be set to the proper cooking or heating temperature. In the closed position, the apparatus 10 can be used to cook TV dinners, steaks, sandwiches, and other flat foods. If cooking a steak, both thermostats 23A and 23B may be set on a high temperature to sear both sides of the steak to seal in the juices, and thereafter set to the desired cooking or heating temperature. The slot 12B of the floating hinge 12 allows the vertical distance between the two superposed heating plates 19A and 19B to be adjusted to accommodate the thickness of the particular food being prepared. If the shoulders 29A and 29B of the heating plates 19A and 19B are engaged when closed, the superposed depressed flat surfaces 27A and 27B define a central cavity 30 surrounded by the raised side walls 28A and 28B and shoulders 29A and 29B.

FIG. 8 shows the portable multi-purpose electric fast cooking apparatus 10 with the hinged heating bases 11A and 11B in the open position as it would be used as a grill, hibachi, or miniature barbecue pit. In this position, a wire grill 31 may be placed over one or both heating plates 19A or 19B. The grill 31 is supported on the shoulder 29A or 29B of the heating plate 19A or 19B and spaced a distance vertically above the depressed flat surface 27A or 27B of the heating plate. Various foods can be placed on the grill 31 and, during cooking, the juices from the food will fall onto the depressed flat surface 27A or 27B of the heating plate to add additional flavor. Mesquite, hickory, and other shavings, or various liquids can also be placed on the depressed flat surface 27A or 27B beneath the grill 31 to impart various flavors to the food. If a grill is not used on the second heating plate, it may be used for warming or toasting buns, or cooking other foods.

Figure 9:
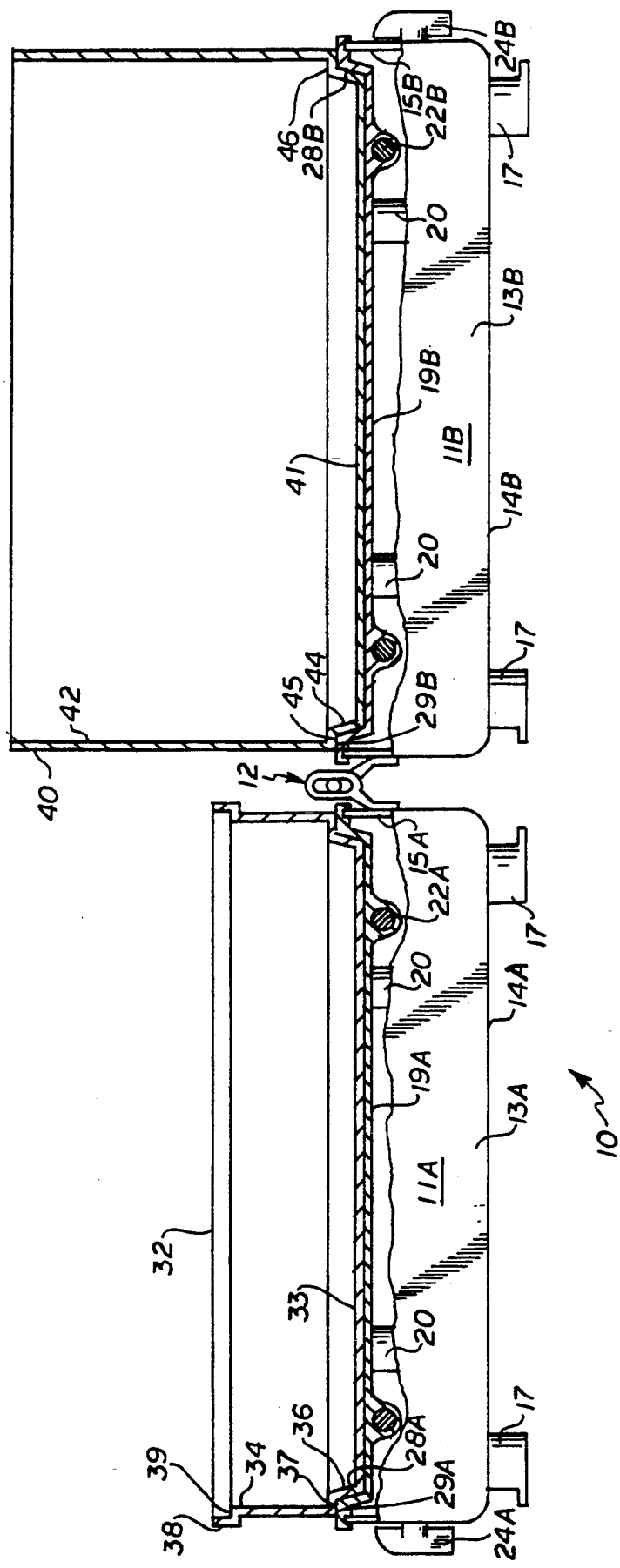
FIG. 9 is a side view of the portable multi-purpose electric fast cooking apparatus in the open position with a fry pan component on one heating plate and a pot component on the other heating plate.

FIG. 9 shows the portable multi-purpose electric fast cooking apparatus 10 with the hinged heating bases 11A and 11B in the open position with the fry pan 32 on one heating plate 19A and the pot 40 on the other heating plate 19B. In this arrangement, various different types of foods can be cooked at the same time. For example, the fry pan 32 can be used for baking casseroles, frying bacon, eggs, etc., while the pot is used for cooking a soup or stew, etc.

FIG. 10 shows the portable multi-purpose electric fast cooking apparatus 10 with the hinged heating bases 11A and 11B in the open position with the pot 40 on one heating plate 19A and using the fry pan 32 as a lid and a grill 31 is supported on the inner shoulder 46 at the bottom of the pot. The enlarged periphery 38 and shoulder 37 at the open (top) end of the fry pan 32 are dimensioned to be received on the top of the pot side wall 42. The fry pan 32 is inverted and placed on the open top end of the pot 40. In this arrangement, the fry pan 32 is used as a cover or lid and the assembly serves as a mini-oven for cooking, roasting, baking, or steaming chicken, fish, pot roast, vegetables, or other large foods. The grill 31 at the bottom of the pot 40 prevents the food from sticking to the bottom of the pot and allows the juices from the food to fall onto the bottom of the pot to add additional flavor. Water or various other liquids can also be placed in the pot beneath the grill 31 to impart various flavors to the food or to use the pot as a pressure cooker or to steam foods. The thermostat 23A can also be adjusted such that the pot can be used for slow cooking and fondue.

In the open position, the portable multi-purpose electric fast cooking apparatus 10 may be used as a dual controlled hot plate. The apparatus occupies very little space and may be easily stored in a standing position supported on one side in a bookshelf or cabinet.

While this invention has been described fully and completely with special emphasis upon a preferred embodiment, it should be understood that within the scope of the appended claims the invention may be practiced otherwise than as specifically described herein.

I claim:

1. A portable multi-purpose electric fast cooking apparatus for use in cooking a variety of foods by various methods comprising in combination;

a pair of pan-shaped housing members having a bottom wall and a side wall hinged together by means of hinge elements such that said housing members may be pivoted between a closed position superposed one above the other in opposed facing relation and an open position laterally adjacent one another, and each said housing side wall having a laterally extending handle to serve as a carrying handle when said housing members are in the closed position;

a metallic heating plate carried by each said housing member, each having an underside and an outward facing side with a central depressed flat surface on the outward facing side surrounded by a raised side wall and shoulder at the top thereof;

said depressed flat surfaces of said heating plates being positioned in opposite facing vertically spaced relation and said surrounding raised side walls and shoulders defining a central cavity in the closed position;

said metallic heating plates being positioned in laterally adjacent relation in the open position and said depressed flat surface, said raised side wall, and said shoulder of each said heating plate defining a mounting surface for receiving and supporting a cooking vessel having a bottom portion configured to mate therewith;

a pair of electrical heating elements one secured to the underside of each said heating plate;

a pair of thermostat control means one connected to each said heating element and both connected in parallel to an electrical power source for independently controlling the temperature of each said heating element; and at least one cooking vessel member having a bottom portion dimensioned mate with said depressed flat surface, said raised side wall, and said shoulder of each said heating plate, and said vessel being removably received and supported thereon in highly efficient heat transfer relation.

2. The apparatus according to claim 1 in which said at least one cooking vessel member has an open top end, a flat bottom wall and an upwardly extending side wall with a reduced periphery bottom portion which extends upwardly a short distance from the bottom wall and then outwardly to define an outer peripheral shoulder;

said vessel bottom wall, reduced periphery, and outer shoulder dimensioned such that said reduced periphery is slidably received within said raised side wall of the heating plate on which said vessel is supported and said vessel bottom wall will rest on said heating plate depressed flat surface and said outer shoulder will engage said heating plate shoulder to minimize heat loss from said heating plate to the atmosphere.

3. The apparatus according to claim 2 in which said at least one cooking vessel member is a shallow-well pan member.

4. The apparatus according to claim 2 in which said at least one cooking vessel member is a deep-well pot member.

5. The apparatus according to claim 4 in which said deep-well pot member having an open top end, a flat bottom wall and an upwardly extending side wall with a reduced periphery bottom portion which extends upwardly a short distance from the bottom wall and then outwardly to define an outer peripheral shoulder and an inner shoulder spaced a distance above said bottom wall.

6. The apparatus according to claim 5 including a wire grill formed of parallel spaced metal rods dimensioned to be selectively supported on said heating plate shoulder a distance above said depressed flat surface of the heating plate on which it is supported, and on said deep-well pot member inner shoulder a distance above said pot member bottom wall.

7. The apparatus according to claim 2 in which
said at least one cooking vessel member comprises a pair of cooking vessels including
a deep-well pot member, and
a shallow-well pan member.

8. The apparatus according to claim 7 in which
said shallow-well pan member having an open top end configured to be received on said deep-well pot member in inverted relation to serve as a cover therefor.

9. The apparatus according to claim 2 in which
said at least one cooking vessel member comprises a pair of cooking vessels including;

a deep-well pot member having an open top end, a flat bottom wall and an upwardly extending side wall with a reduced periphery bottom portion which extends upwardly a short distance from the bottom wall and then outwardly to define an outer peripheral shoulder and an inner shoulder spaced a distance above said bottom wall;

a shallow-well pan member having an open top end configured to be received on said deep-well pot member in inverted relation to serve as a cover therefor; and a wire grill formed of parallel spaced metal rods dimensioned to be selectively supported on said heating plate shoulder a distance above said depressed flat surface of the heating plate on which it is supported, and on said deep-well pot member inner shoulder a distance above said pot member bottom wall.

\* \* \* \* \*